US006238609B1

(12) United States Patent
Stecker

(10) Patent No.: US 6,238,609 B1
(45) Date of Patent: May 29, 2001

(54) DECORATIVE SIGNAGE WITH PORTIONS IN RELIEF AND METHOD OF MAKING SAME

(76) Inventor: William M. Stecker, 513 Twinn Elms, Chapel Hill, NC (US) 27516

( * ) Notice: Subject to any disclaimer, the term of this patent is extended or adjusted under 35 U.S.C. 154(b) by 0 days.

(21) Appl. No.: 09/315,681

(22) Filed: May 20, 1999

(51) Int. Cl.[7] .................................................. B29C 39/12
(52) U.S. Cl. .................. 264/246; 264/255; 264/259; 264/308; 264/319; 264/DIG. 57; 264/DIG. 59
(58) Field of Search ................... 264/246, 255, 264/259, 319, 320, 308, 347, 344, DIG. 59, DIG. 57

(56) References Cited

U.S. PATENT DOCUMENTS

| | | | |
|---|---|---|---|
| 3,751,319 | 8/1973 | Green et al. ........................... | 156/242 |
| 4,239,721 | * 12/1980 | Nitzberg ................................ | 264/157 |
| 4,473,673 | * 9/1984 | Williams et al. ..................... | 523/318 |
| 4,528,227 | * 7/1985 | Frachtmann .......................... | 428/49 |
| 4,880,588 | 11/1989 | Brault et al. .......................... | 264/163 |
| 4,895,690 | 1/1990 | LaRoche et al. ..................... | 264/245 |
| 4,959,401 | 9/1990 | Bellasalma et al. ................. | 523/466 |
| 5,152,690 | 10/1992 | Todd .................................... | 434/113 |
| 5,166,230 | 11/1992 | Stecker ................................ | 523/500 |
| 5,245,744 | 9/1993 | Edgerton ............................. | 29/525 |
| 5,336,458 | 8/1994 | Hutchison et al. .................. | 264/220 |
| 5,403,189 | 4/1995 | Edgerton ............................. | 434/113 |
| 5,438,781 | 8/1995 | Landmann .......................... | 40/584 |
| 5,512,122 | 4/1996 | Sokyrka ............................ | 156/275.5 |
| 5,608,979 | 3/1997 | Johnson ............................. | 40/491 |
| 5,720,616 | 2/1998 | Schuler, III ......................... | 434/113 |
| 5,779,919 | 7/1998 | DiPietro et al. ..................... | 216/4 |
| 5,885,503 | * 3/1999 | Bordener ............................ | 264/254 |

FOREIGN PATENT DOCUMENTS

| | | | |
|---|---|---|---|
| 770462 | 3/1957 | (GB) . | |
| WO94/09078 | 4/1994 | (WO) | ........................... C09D/11/10 |

OTHER PUBLICATIONS

International Search Report dated Sep. 22, 2000; International Application No. PCT/US00/13909.

* cited by examiner

Primary Examiner—Jan H. Silbaugh
Assistant Examiner—Edmund H. Lee
(74) Attorney, Agent, or Firm—Myers Bigel Sibley & Sajovec

(57) ABSTRACT

A method of producing a low stress, decorative article of manufacture having at least one relief portion extending therefrom includes casting a first thermosetting resin into recesses formed within a mold surface such that the first resin is not in contact with the mold surface. The first resin is partially cured to a "B" stage to provide an air inhibited out-of-mold surface. A coating of second thermosetting resin, such as unsaturated polyester, is then applied onto the partially cured first resin and onto the mold surface. A substrate having a face is placed in contacting relationship with the second thermosetting resin film and a progressively moving compressive force is applied to the second thermosetting resin via the substrate to prevent air from becoming entrained within the second thermosetting resin. The first and second thermosetting resins cure without the second thermosetting resin imparting shear stress on the first thermosetting resin.

15 Claims, 9 Drawing Sheets

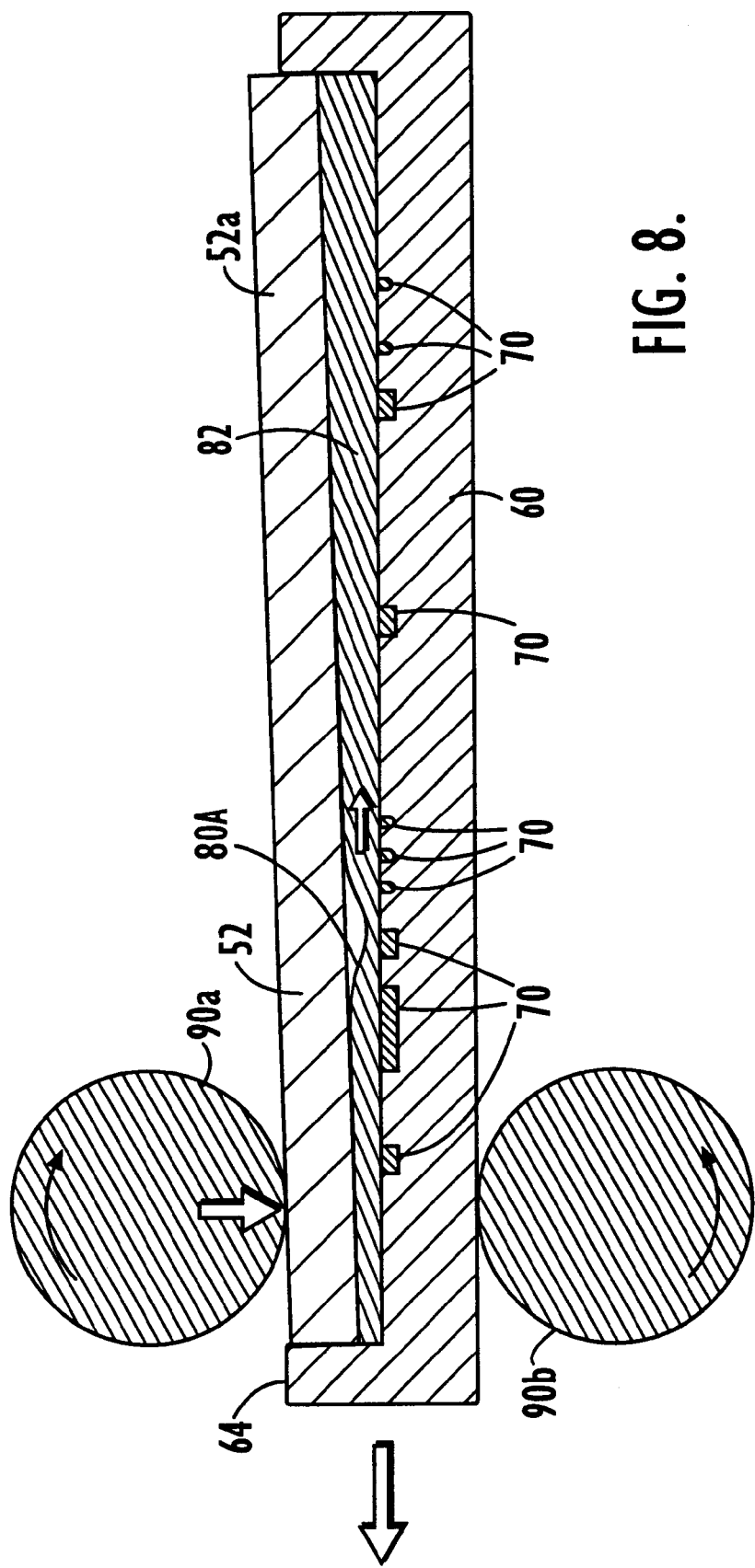

DECORATIVE SIGNAGE WITH PORTIONS IN RELIEF AND METHOD OF MAKING SAME

FIELD OF THE INVENTION

The present invention relates generally to the fabrication of molded articles and, more particularly, to the fabrication of molded articles having relief portions extending therefrom.

BACKGROUND OF THE INVENTION

The Americans with Disabilities Act (ADA) has mandated that signs which are to be utilized for "permanent room identification" in public facilities are to have upper case lettering which is to be raised at least 1/32 inch from the background of the sign. Further required by the ADA is the use of Grade II Braille on "permanent room identification" signs which is also to be raised at least 1/32 inch from the background of the sign.

Displays, such as signs, having raised characters or images (i.e., "relief" portions) with colors different from a background color thereof are known. Often, such displays are referred to as "one-off" displays because the raised characters and/or images are unique to each display. For example, hotels often mount a sign next to each room to indicate the number of each room. Because each room in a hotel conventionally has a unique number, each respective room number sign will be unique. Co-pending and co-assigned U.S. patent application Ser. No. 09/122,837 describes methods of producing one-off displays, and is incorporated herein by reference in its entirety.

A known method of fabricating displays with raised images and/or characters is to apply preformed characters or images of one color to a substrate of another color. Another known method is to produce an article having images or characters in relief therewith, and then to apply different colors to the raised portions, such as by painting, staining, silk-screening, and the like (often referred to as "tipping"). Unfortunately, these methods may be somewhat labor intensive and may be prone to fabrication errors. Furthermore, displays produced via conventional methods may be rendered aesthetically unpleasing as a result of wear or damage. For example, paint may chip off of a raised portion of a display or an attached raised portion may become detached from the display through wear and/or vandalism.

Displays with raised portions formed by casting a polymeric resin into a mold having one or more recesses can be adversely affected by resin shrinkage during the curing process. Shrinkage of raised portions during curing can induce shear stress that can damage the raised portions and/or display. In addition, displays with raised portions formed by casting a polymeric resin into a mold having one or more recesses can be adversely affected by the presence of air bubbles and voids. For example, polyester resin, by nature, holds air bubbles tenaciously.

SUMMARY OF THE INVENTION

It is therefore an object of the present invention to provide durable, decorative display articles with relief portions extending therefrom that are capable of retaining an aesthetically pleasing appearance even when damaged and subjected to wear and tear.

It is another object of the present invention to provide methods of producing durable, solid surface display articles with relief portions, wherein the relief portions have color schemes different from that of a background.

It is another object of the present invention to provide methods of producing display articles with relief portions formed from polymeric resins that are resistant to damage caused by polymeric resin shrinkage during curing.

These and other objects of the present invention are provided by a method of producing a low stress, decorative article of manufacture having at least one relief portion extending therefrom. A first thermosetting resin, such as an unsaturated polyester, having a first color is cast into recesses formed within a mold surface and such that the first resin is not in contact with the mold surface. Each recess within the mold has a configuration of a respective alphanumeric character, Braille character, or graphic design. The first resin is partially cured to a "B" stage to provide an air inhibited out-of-mold surface. A coating of a second thermosetting resin, such as an unsaturated polyester, is then applied onto the partially cured first resin and onto the mold surface. The coating may have a thickness of up to about 0.10 inch and preferably has an air release agent mixed therewithin. The second thermosetting resin can have one or more colors, and can be configured to cure to a transparent state.

A substrate (e.g., a wood, metal or polymer backing member) having a face is placed in contacting relationship with the second thermosetting resin film. A progressively moving compressive force is then applied to the second thermosetting resin via the substrate to prevent air from becoming entrained within the second thermosetting resin. For example, the mold can be passed through a pair of pinch rollers such that a first compressive force is applied to the substrate and an opposite second compressive force is simultaneously applied to the mold.

The first and second thermosetting resins are then allowed to cure such that the second thermosetting resin film adheres to the substrate face, and such that molecular cross-linking occurs between the first and second thermosetting resins without the second thermosetting resin film imparting shear stress on the first thermosetting resin. The cured article of manufacture is then removed from the mold.

A decorative article of manufacture produced in accordance with methods of the present invention includes a backing member having a thin polymer layer adhered to a face thereof. The polymer layer is devoid of all air bubbles and/or voids and has a thickness of between about 0.003 inch and about 0.050 inch. One or more relief portions extend from the thin polymer layer. Each relief portion is formed from a polymer material that is molecularly cross-linked at an interface with the thin polymer layer.

According to one embodiment, the thin polymer layer and the relief portions have different colors. According to another embodiment, the thin polymer layer and the relief portions have the same color. According to another embodiment, the thin polymer layer is transparent such that such that the backing member face is visible therethrough.

Exemplary decorative articles produced by the above process include architectural facing, signs, displays and the like. Signs produced in accordance with the present invention are particularly suitable for use where a durable finish and surface is desired. Because the relief portions of an article of manufacture produced in accordance with the present invention have the same color throughout the thickness of the resin material, chips and other forms of wear do not have a detrimental appearance to the article. Decorative articles may be produced to simulate almost any type of surface and may have almost any pattern and color scheme desired when produced according to the processes of the present invention. Furthermore, fabrication methods according to the present invention can be more efficient than paint inlay or overlay methods and can produce articles that are more authentic looking than articles with painted surfaces.

Because the thermosetting resin applied to the backing member face is a thin film, decorative articles produced by the above process experience little or no shrinkage during curing.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 8 is a side section view of the mold assembly of FIG. 7 illustrating a wave of thermosetting resin being pushed forward by the progressively moving compressive force.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Solid surface articles have been available for over twenty years. The term "solid surface" relates to a material that has substantially the same physical and aesthetic properties throughout its thickness. Thus, if the surface of the material is sanded or planed, a substantially identical aesthetic is found. Solid surface materials are typically molded out of various thermosetting resins such as unsaturated polyester resins. Various aesthetics are produced such as solid color, marbleized color (see, for example, U.S. Pat. No. 5,166,230 to Stecker) and particulate dispersion (see, for example, U.S. Pat. No. 4,959,401 to Bellasalma et al.).

Figure 1:
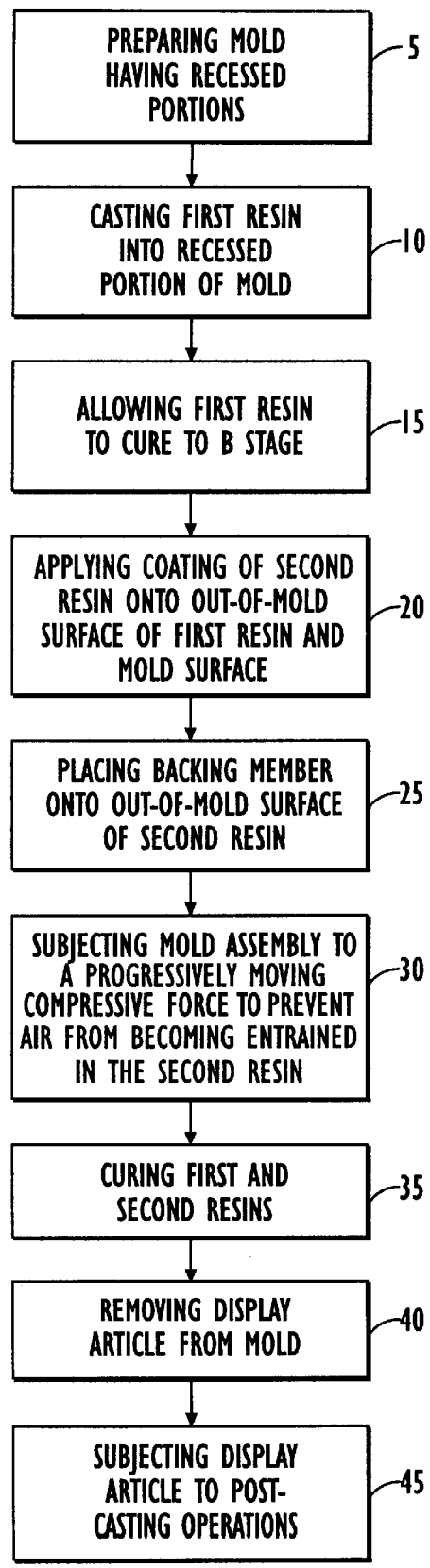
FIG. 1 is a flow chart of operations for manufacturing articles of display according to an embodiment of the present invention.

Referring now to FIG. 1, operations for making a solid surface decorative article of manufacture having relief portions according to an embodiment of the present invention are schematically illustrated. Initially, a mold is prepared having one or more recessed portions formed within a surface of the mold (Block 5). The recesses may be reversed images of a desired image or alphanumeric character. A first thermosetting resin having a first color is cast within at least one of the formed recesses (Block 10). Any of the first thermosetting resin that is in contact with the surface of the mold is removed using acetone or other known solvents. Furthermore, any dirt or foreign materials are also removed from the surface of the mold. Next, the first thermosetting resin is preferably allowed to at least partially cure to a B-stage (Block 15). However, it is understood that partial curing of the first thermosetting resin is not required.

A coating of second thermosetting resin is then applied to the "out-of-mold" surface of the partially cured first resin and to the mold surface (Block 20). The first and second thermosetting resins molecularly bond together during curing to create an integral polymeric coating having relief portions extending therefrom.

An air release agent (also referred to as a surface tension reducer) is mixed with the second thermosetting resin to facilitate the removal of air bubbles and voids. The thickness of the second thermosetting resin coating may vary, but is preferably up to about 0.10 inches. The second thermosetting resin can have the same color as the first thermosetting resin. Alternatively, the second thermosetting resin can have a different color from the first thermosetting resin. Furthermore, the second thermosetting resin can be clear or transparent.

A substrate or backing member is then placed on top of the "out-of-mold" surface of the coating of second resin (Block 25). The mold assembly (i.e., mold, first and second resins, and backing member) is subjected to a progressively moving compressive force such that the second resin is compressed between the backing member and the mold to prevent air bubbles or voids from becoming entrained within the second resin and to form a thin film (Block 30).

The first and second thermosetting resins are then allowed to cure to a fully polymerized state (Block 35). The backing member with the cured first and second resins adhered thereto can then be removed from the mold (Block 40) and the resulting decorative surface having relief portions extending therefrom can be subjected to various post-casting operations as needed (Block 45).

Figure 2:
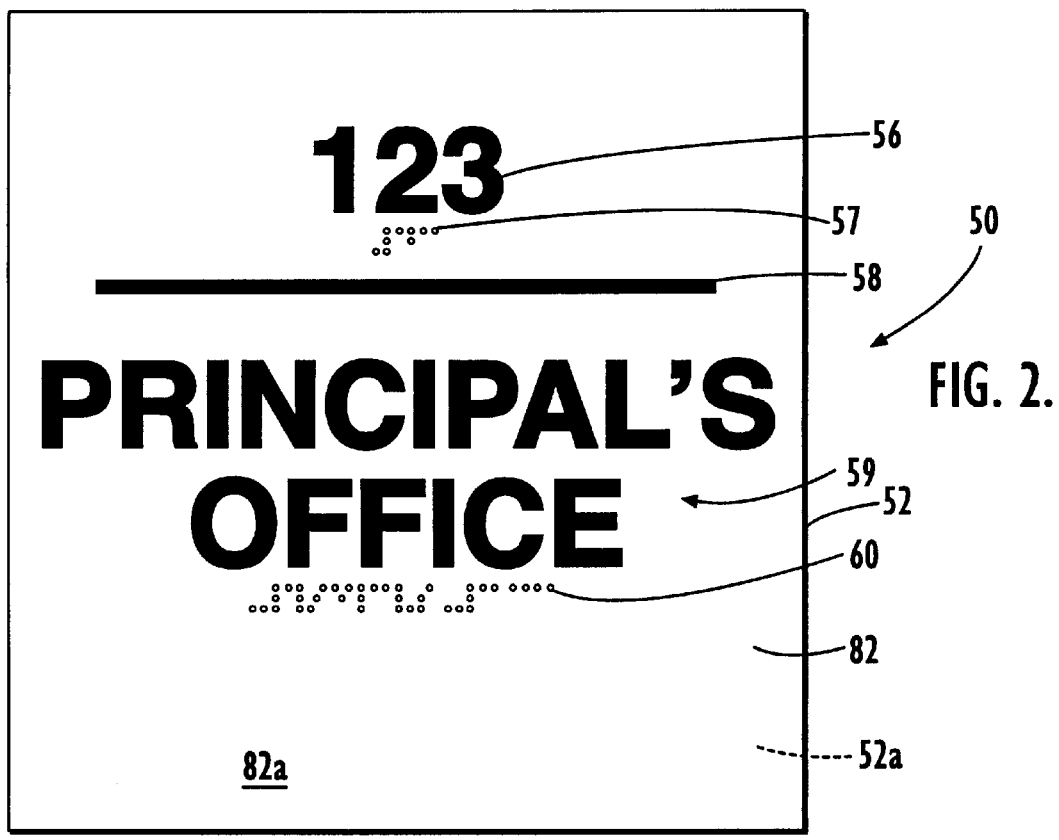
FIG. 2 is a plan view of a decorative article of display including a face and relief portions extending therefrom, according to an embodiment of the present invention.

Referring now to FIG. 2, a decorative article of manufacture 50, according to an embodiment of the present invention, is illustrated. The decorative article of manufacture 50 includes a backing member 52 having a surface 52a with a thin film 82 of cured thermosetting resin adhered thereto. The thin film 82 of thermosetting resin has an exposed surface 82a with relief portions 56–60 extending outwardly therefrom, as illustrated. For example, the illustrated relief portion 56 has the configuration of the number "123". The illustrated relief portion 57 is a pattern of Braille characters corresponding to the number "123". The illustrated relief portion 58 has the configuration of a line. The illustrated relief portion 59 has the configuration of the characters "PRINCIPAL'S OFFICE". The illustrated relief portion 60 is a pattern of Braille characters corresponding to the characters "PRINCIPAL'S OFFICE".

It is understood that articles of manufacture according to the present invention may have relief portions extending therefrom with various shapes and configurations, including but not limited to images, alphanumeric characters, Braille and the like. Furthermore, the resin forming the relief portions 56–60 may have the same or different color as the resin forming the thin film 82 applied to the backing member surface 52a. For example, the relief portions 56–60 may be formed from thermosetting resin having a gray color and the thin film of resin 82 may have any number of colors different from the gray color of the relief portions 56–60, such as red and green. Furthermore, the resin forming the thin film 82 applied to the backing member surface 52a may be transparent thereby allowing the color of the backing member 52 to be visible.

An important aspect of the present invention is that a single structure solid surface decorative article of display can be produced having relief portions extending therefrom with one or more different colors than the color of the background. Because the relief portions are molecularly bonded to the thin resin film 82 via polymerization, an article of display according to the present invention has strength and durability superior to articles formed from separate members.

According to the present invention, coloring pigmentation is preferably added to and mixed thoroughly with the first and second thermosetting resins prior to curing. As a result, the respective color of the first resin extends throughout each of the relief portions 56–60. Similarly, the respective color of the second resin extends throughout the thin film 82. Accordingly, if a portion of the relief portions 56–60 were removed as a result of chipping or wear, the remaining portions would still have the same color, unlike conventional display articles wherein the color is added to an outer layer thereof. Similarly, the color of the resin forming the thin film 82 is preferably uniform throughout such that if a portion thereof were removed as a result of chipping or wear, the remaining portion of the film 82 would still exhibit the same color.

Figure 3:
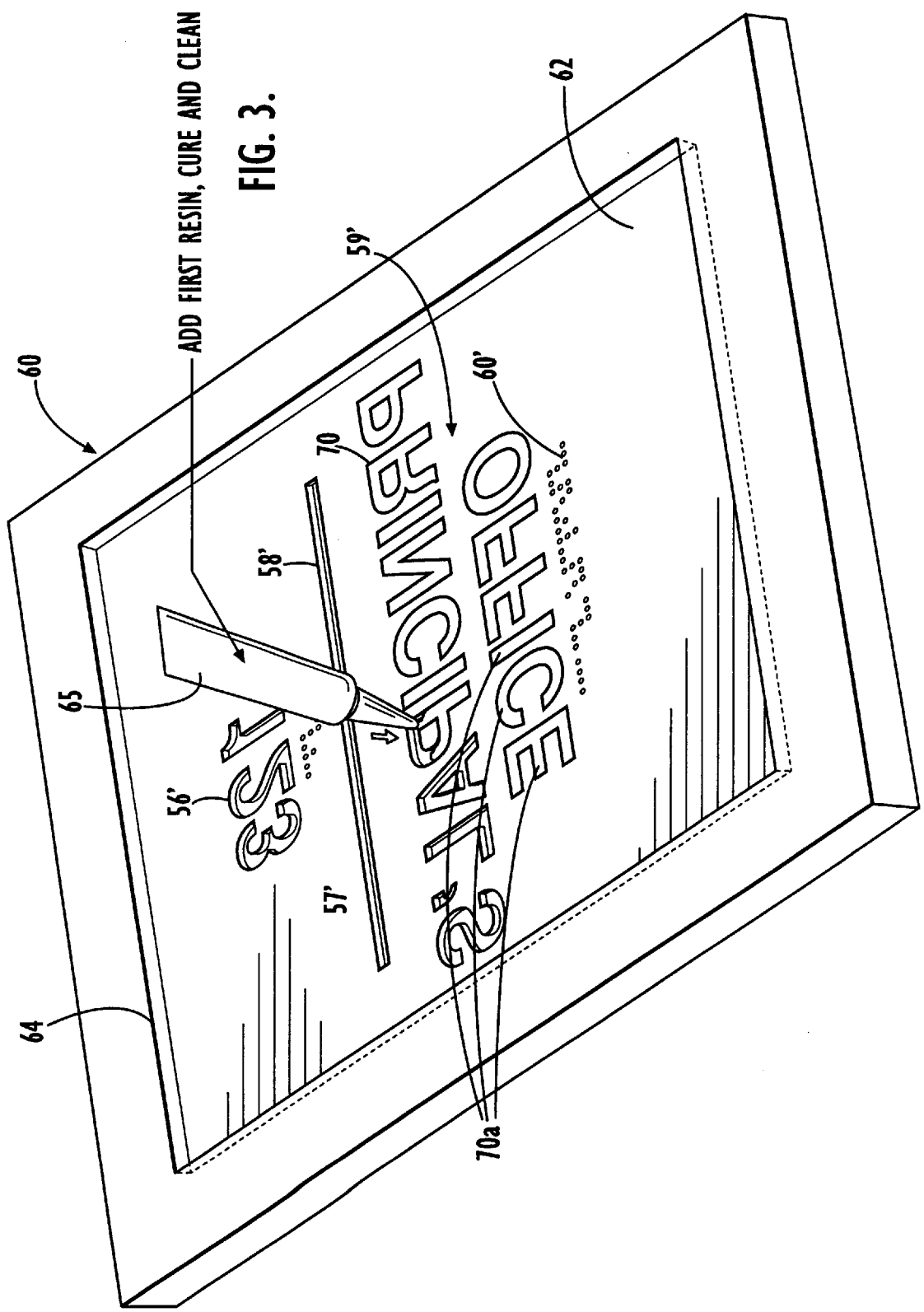
FIG. 3 is a perspective view of a mold for use in preparing the decorative article of display of FIG. 2 and wherein a thermosetting resin is being cast into the recesses of the mold.

Referring now to FIG. 3, a mold 60 for producing the article of manufacture 50 shown in FIG. 2, according to the present invention, is illustrated. The surface 62 of the mold 60 has a generally planar configuration. A continuous wall 64 extends around the mold surface 62, as illustrated, defining an area into which a second curable thermosetting resin may be applied. This defined area may have various shapes and configurations.

Recess portions 56'–60' are formed within the mold surface 62 as illustrated. Recess portions 56'–60' are configured to form the respective relief portions 56–60 in the article of manufacture 50 as will be described below. In the illustrated embodiment, recess portion 56' has the reversed configuration of the number "123" (56). Recess portion 57' has the reversed configuration of the pattern of Braille characters 57 that corresponds with the number "123" (56). Recess portion 58' has the reversed configuration of the line 58. Recess portions 59' has the reversed configuration of the characters "PRINCIPAL'S OFFICE" 59. Recess portion 60' has the reversed configuration of the pattern of Braille characters 60 that correspond with the characters "PRINCIPAL'S OFFICE" 59.

It is understood that other mold sizes, shapes, and configurations may be utilized to produce decorative articles having raised portions according to the present invention, without limitation. In the illustrated embodiment, the mold 60 is configured to produce a decorative, multi-colored sign of the type utilized to identify offices. However, molds for producing articles of manufacture according to the present invention may have any shape, pattern, and configuration desired, the selection of which will be within the purview of one skilled in the art.

Molds utilized in producing articles of manufacture according to the present invention may be made from various materials including, but not limited to aluminum, polyethylene, silicone or fiberglass composite, and may be cast or machined to produce the decorative pattern, as would be known to those skilled in the art. In addition, molds may be formed from flexible material.

Prior to dispensing a resin within the recessed portions of a mold, a release coating is applied to the mold. Exemplary release coating include, but are not limited to, silicon release agents, wax in the carnauba wax family, TEFLON® (a trademark of the E.I. DuPont de Nemours Company, Wilmington, Del.), zinc stearate, or any similar material which will function as a release agent for the particular resin material being used to create the decorative article, the selection of which is within the skill of one in the art.

The illustrated mold 60, including the surface 62 and the reverse-image recesses 56'–60' formed therein, may be designed and created under computer control. Preferably, the decorative pattern for each article produced in accordance with the present invention is designed and stored on a computer. In addition, the processes or portions thereof described herein may be under computer control. For patterns and designs which do not lend themselves to computer-assisted machining, traditional mold and pattern making methods can be used. Sculpting and texture transfer to silicone molds are examples.

Still referring to FIG. 3, a first thermosetting resin 70 in an uncured state and having a first color is illustrated being cast into the mold recesses 56'–60'. Preferably, the first thermosetting resin 70 is cast into the recesses 56'–60' such that the first thermosetting resin 70 does not contact the mold surface 62. Alternatively, any portion of the first thermosetting resin that does contact the mold surface 62 is removed from the mold surface 62. The first thermosetting resin 70 may be cast into the recesses 56'–60' of the mold surface 62 via a nozzle 65 or any other known means of applying resin, such as a doctor blade or squeegee. Throughout the processes of the present invention, resin may be applied in various ways, and is not limited to the nozzle 65 schematically illustrated in the drawings.

The first thermosetting resin 70 is then allowed to at least partially cure to a B-stage of polymerization. As is known to those skilled in the art of polymerization, the term "B-stage" refers to the stage of cure wherein the material is substantially solid but still has open sites available for crosslinking. When partially cured, the first thermosetting resin 70 within each recessed portion 56'–60' forms a respective out-of-mold surface 70a within the recesses 56'–60', as illustrated in FIG. 3. In the case of polyester and other air inhibited polymers, the air exposed surface (out-of-mold surface 70a) of the first resin 70 in each recess can remain in this B-stage for an extended period of time.

As mentioned above, any of the first thermosetting resin that does come into contact with the mold surface 62 is preferably removed from the mold surface 62 prior to applying the second thermosetting resin. In addition, any foreign material is also removed from the mold surface 62 prior to applying the second thermosetting resin (80, FIG. 4).

Figure 4:
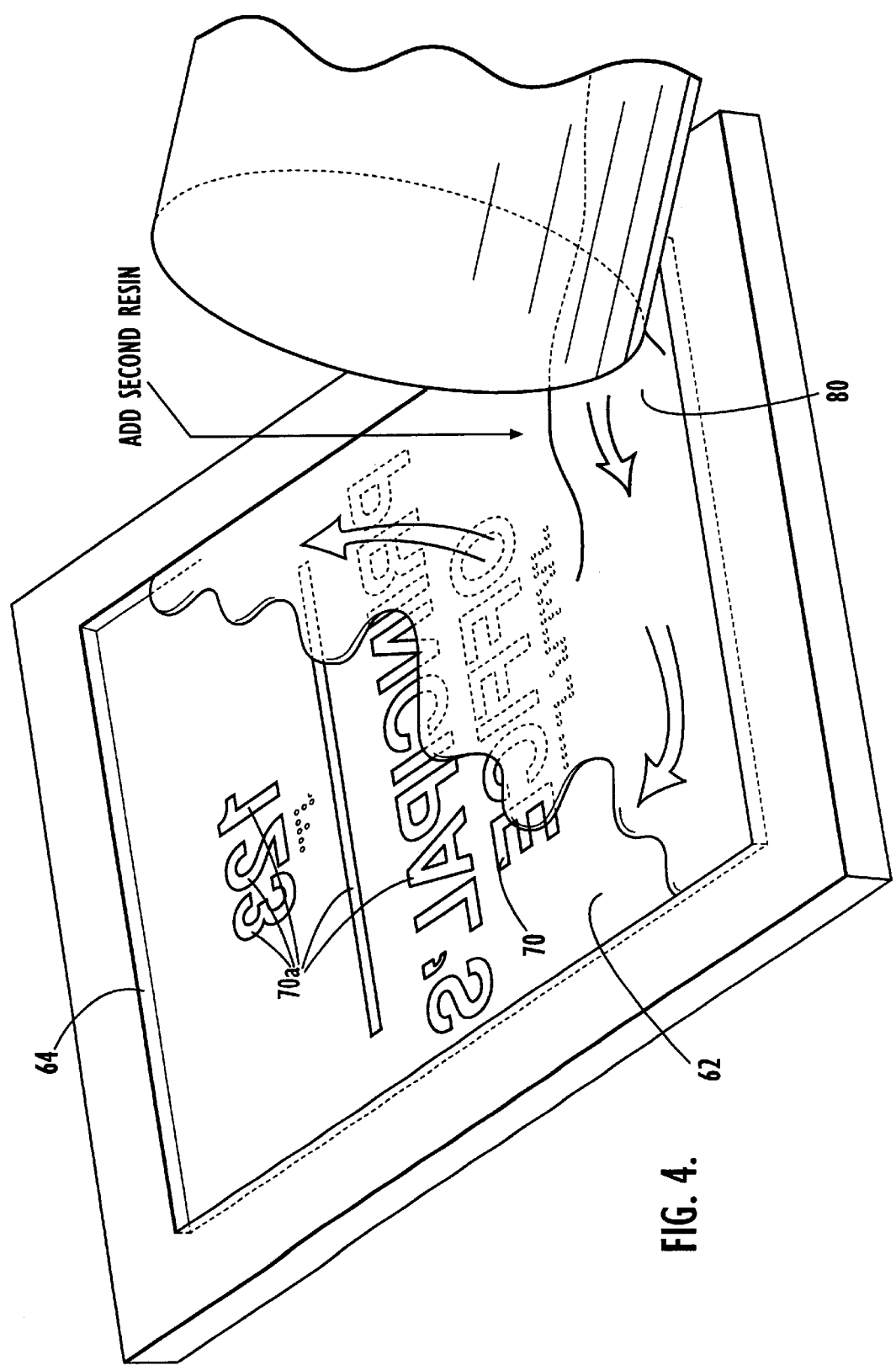
FIG. 4 is a perspective view of the mold of FIG. 3 illustrating a coating of thermosetting resin being applied to the out-of-mold surface of the thermosetting resin disposed within the mold recesses and to the mold surface.

Referring now to FIG. 4, a second thermosetting resin 80 in an uncured state is illustrated being added to the out-of-mold surfaces 70a of the partially cured first thermosetting resin 70 in each of the recessed portions 56'–60' and onto the mold surface 62. The second thermosetting resin 80 may be cast onto the respective out-of-mold surfaces 70a of the partially cured first thermosetting resin 70 and onto the mold surface 62 via any known means of applying resin.

Figure 5:
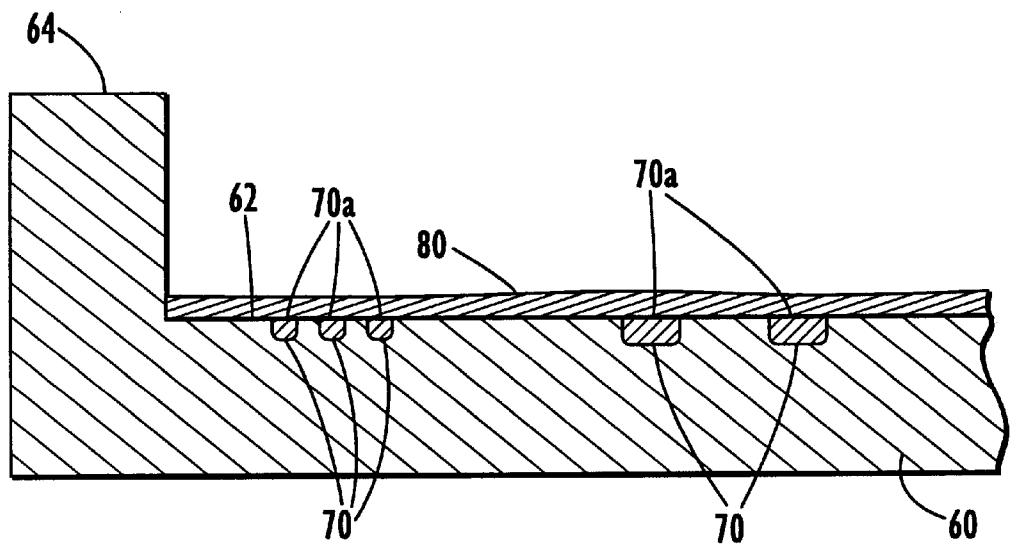
FIG. 5 is a side section view of the mold of FIG. 4 illustrating the coating of thermosetting resin applied to the out-of-mold surface of the thermosetting resin disposed within the mold recesses and to the mold surface.

FIG. 5 is a side section view of the mold 60 of FIG. 3 illustrating the partially cured first thermosetting resin 70 within the various recessed portions and the second thermosetting resin 80 disposed on the out-of-mold surfaces 70a of the first resin 70 and on the mold surface 62.

It is understood that a single thermosetting resin may be applied within the recessed portions 56'–60' and onto the mold surface 62, thereby eliminating the need for a second thermosetting resin. A backing member 52 may be applied to the single resin as described below to prevent air from becoming entrained therein.

Figure 6:
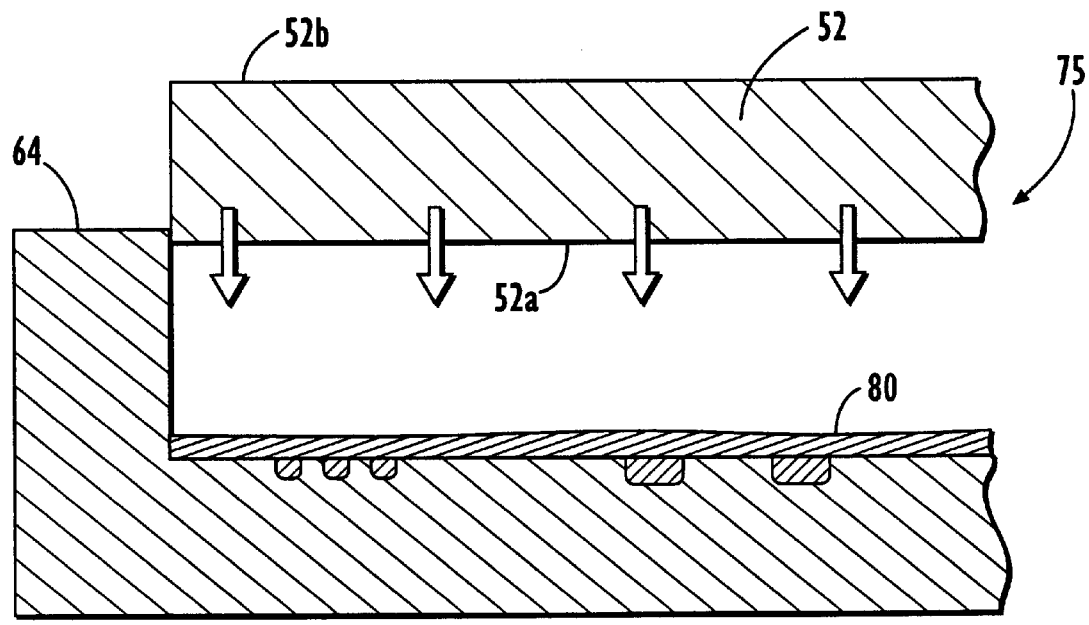
FIG. 6 is a side section view of the mold of FIG. 5 wherein a substrate is being placed on the outof-mold surface of the coating of thermosetting resin.

Referring now to FIG. 6, a backing member 52 having opposite first and second surfaces 52a and 52b is placed on top of the thin film 82 such that a portion of the backing member first surface 52a is in contacting relationship with the second resin 80. The backing member 52 can be formed from virtually any type of material to which the second resin 80 can adhere to readily. Exemplary materials include, but are not limited to, wood, metal and polymers. Furthermore, the backing member 52 can be formed from various non-polymeric materials, such as plaster and concrete. In addition, materials to which the second thermosetting resin 80 cannot adhere to readily can be treated to accept the second resin, such as via machining and/or chemical treatment.

Figure 7:
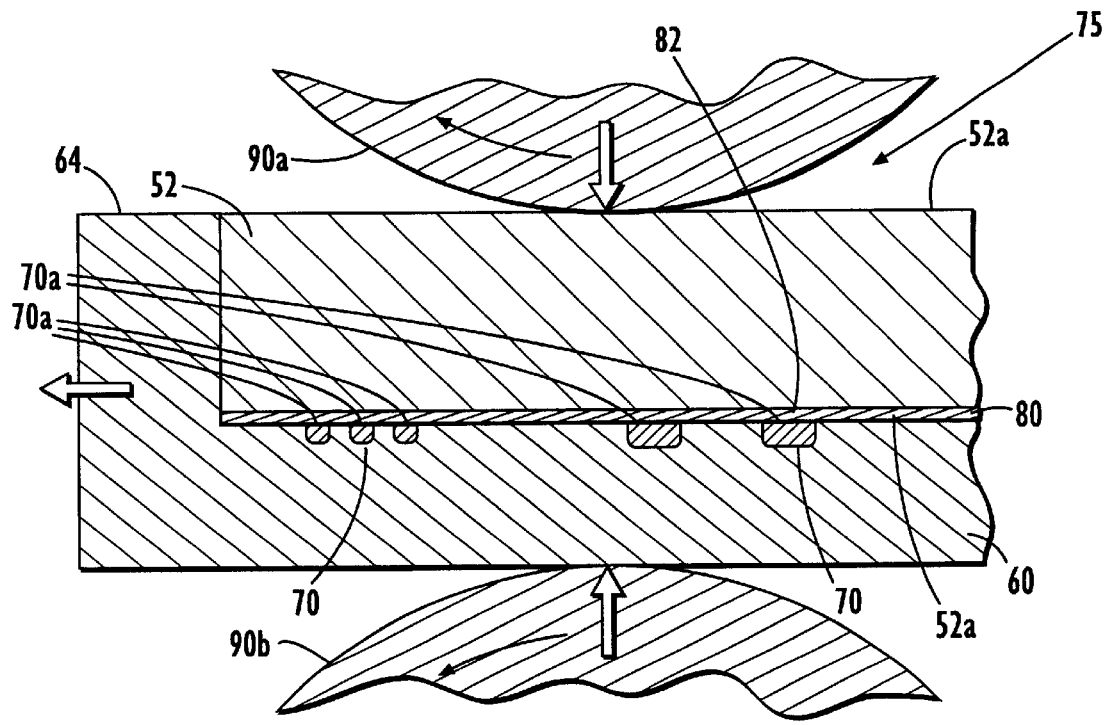
FIG. 7 is an enlarged side section view of the mold assembly of FIG. 6 illustrating the application of a progressively moving compressive force to the mold assembly via a set of pinch rollers.

Referring now to FIGS. 7 and 8, the mold assembly 75 (i.e., mold 60, first and second resins 70, 80, and backing member 52) is subjected to a progressively moving compressive force via a pair of pinch rollers 90a, 90b that move relative to the mold assembly 75. The pinch rollers 90a, 90b cause the backing member to tilt slightly as illustrated in FIG. 8 which pushes a "wave" 80a of resin slightly ahead of the location of applied compressive force as the mold assembly 75 is moved therebetween to prevent air bubbles or voids from becoming entrained within the second resin 80. The progressively moving compressive force also causes excess second resin 80 to squeeze out from between the backing member 52 and the mold 50 to form a thin film 82 that adheres to the backing member and to the out-of-mold surfaces 70a of the first resin 70.

Subsequently, the first and second thermosetting resins 70, 80 are allowed to cure to a fully polymerized state. Curing the first and second thermosetting resins 70, 80 preferably takes place using conventional techniques, as described in U.S. Pat. No. 5,166,230 to Stecker. Curing may occur at room temperature, for example between about 15° C. and 38° C., or at elevated temperatures, for example, between about 100° C. and 150° C. The specific curing temperature and curing time may vary from the above and will depend upon the particular resin or resins cast and is information which is well known in the art.

Figure 9:
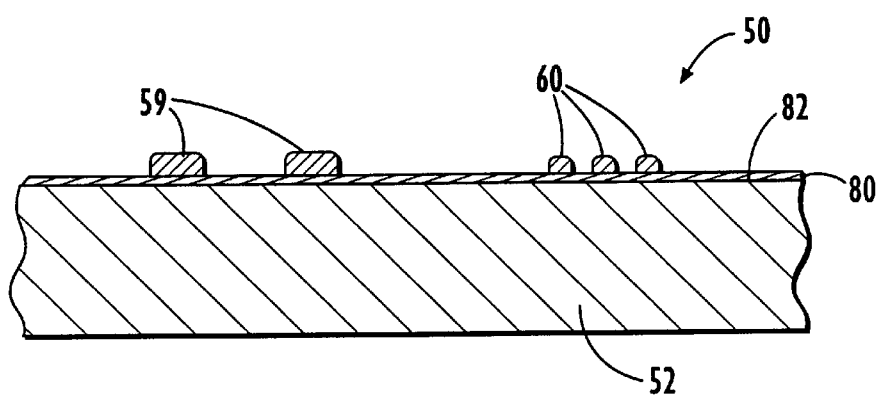
FIG. 9 is a section view of the decorative article of FIG. 10 taken along lines 9—9.

After sufficient curing time, the display article 50 is removed from the mold 60 as illustrated in FIG. 9. After removal from the mold 60, the decorative article 50 may be placed between wooden sheets or other flat substrates (not shown) to help maintain flatness during cooling. Additional steps known to those skilled in the art, such as polishing, may include subjecting the exposed surface 82a of the thin film of resin 82 and/or the relief portions 56–60 to sanding or other post-casting/curing operations sufficient to produce a finished product.

The preparation of curable thermosetting resins is well known in the art and generally involves mixing resins with various filler materials, fiber reinforcement, appropriate catalysts, and desired tinting or pigment materials, referred to as a resin system. Preferred filler materials, such as alumina, trihydrate and/or glass fibers, are selected to impart desired properties to a thermosetting resin. According to the present invention, the thermosetting resin within one or more recesses of a mold surface has one or more color pigments mixed therein that are different from the color pigment mixed in with the thermosetting resin cast onto the mold surface. Preferably, the mixing of the thermosetting resins for use in the above process includes mixing under vacuum to remove any air entrapped by the mixing process.

Although a variety of resin materials may be used in accordance with the present invention, thermosetting resins are preferred. The term "thermosetting resin" relates to a polymer that solidifies or "sets" irreversibly on heating. Suitable thermosetting resins include polyesters, epoxies, urethanes, or any other similar resins preferably having various volatile components which cure without releasing solvents and/or gases therein. It is recognized that some polymers although technically "thermoplastics" could be used in the present invention with the proviso that they do not flow under conditions to which the article is typically subjected and the cured resin can be post finished such as via sanding and other operations. Exemplary polymers of this type are the acrylics and vinyls.

The thermosetting resins useful herein can vary and include unsaturated polyesters, phenolics, epoxies, polyurethanes, and the like, and mixtures and blends thereof. The unsaturated polyester resins are a particularly preferred resin. Useful unsaturated polyester resins include practically any esterification product of a polybasic organic acid and a polyhydric alcohol, wherein either the acid or the alcohol, or both, provide the ethylenic unsaturation. Typical unsaturated polyesters are those thermosetting resins made from the esterification of a dihydric alcohol with an ethylenically unsaturated dicarboxylic acid. Examples of useful ethylenically unsaturated polycarboxylic acids include maleic acid, fumaric acid, itaconic acid, dihydromuconic acid, and halo and alkyl derivatives of such acids and anhydrides, and mixtures thereof. Exemplary polyhydric alcohols include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexandediol, 1,7-heptanediol, 1,8-octanediol, 1,9-nonanediol, 1,10-decanediol, 2,10-decanediol, 1,4-cyclohexandediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

Unsaturated polyester resins can also be derived from the esterification of a saturated polycarboxylic acid or anhydride with an unsaturated polyhydric alcohol. Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3-3,-diethylglutaric acid, adipic acid, pimelic acid, suberic acid, azelaic acid, sebaccic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Useful unsaturated polyhydric alcohols for reacting with the saturated polycarboxylic acids include ethylenic unsaturation-containing analogs of the above saturated alcohols (e.g., 2-butene-1,4-diol). The unsaturated polyester resins are generally crosslinked with a compatible crosslinking monomer such as styrene, vinyl toluene, methyl methacrylate, methyl styrene, divinyl benzene, diallyl phthalate and the like.

The amount of polyester thermosetting resin in a resin system used with the present invention may range from about 35 percent to about 100 percent by weight of the total resin system. The amount of crosslinking monomer may be about 10 percent to about 65 percent by weight of the resin system.

Exemplary room temperature free radical initiators include hydrogen peroxide and methyl ethyl ketone peroxide ("MEKP") noting that most commercially available MEKP includes some hydrogen peroxide.

Exemplary peroxy-type free radical polymerization initiators are the hydroperoxides such as tert-butyl hydroperoxide, 2,5-dimethylhexane-2,5-dihydroperoxide, cumene hydroperoxide, para-methane hydroperoxide and the like; peroxy esters such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide; 2,4-dichlorobenzoyl peroxide, lauroyl peroxide and the like. Also azo promoters such as azobisbutrylnitrile can be used. The amount of first and second curing agents used is dependent on the time desired for thermosetting, but is typically a short period of time (i.e., less than 3 hours, typically less than 2 hours and often less than 1 hour). The amount used is about 0.01 to about 0.1 percent by weight of the first curing agent and about 0.1 to about 5 percent by weight of the second curing agent.

A resin system used in accordance with the present invention can also include various additives commonly employed in thermosetting resin compositions such as fillers, colorants, veining pigments, thixotropic agents, chemical thickening agents, casting part release agents, low profile additives, fiber reinforcement, and other additives for imparting desirable properties such as hardness, color, flame retardancy, aesthetic appearance, smoothness, clarity and the like. Fibers added may include glass, carbon, metals, and the like. Additionally, resins may be selected having a degree of translucency allowing the colors of other resins used to be visible. A variety of desired aesthetic characteristics can be achieved by selecting resins having different colors and properties, as would be understood by those having skill in the art.

Exemplary fillers can include, among others, alumina trihydrate, quartz powder, marble powder, crushed silica, calcium carbonate, clay, glass fibers, powdered metals, mixtures thereof and other mineral and inorganic particulates that contribute to the aesthetics of the final article. The fillers are used in amounts of about 20 to about 300 percent by weight of resin.

Various colorants and veining pigments can be added for purposes of providing background color and other aesthetically pleasing features to the resin system and molded article. For example, tinting pigments such as titanium dioxide and the like can be added or a trace amount of carbon black can be swirled in to contribute to the marble-like appearance. The amount used is typically less than about 3 percent by weight.

Thixotropic agents are agents which cause the viscosity of the resin system to vary as a function of its state of agitation and the previous history of motion within the fluid. These agents are preferably used to maintain the filler and other additives in suspension while the resin is curing. Generally, the viscosity of a thixotropic fluid decreases as its state of agitation and length of agitation increases, and increases as its state of agitation and length of agitation decreases. An exemplary thixotropic agents is fumed silica. The amount used is typically less than about 1 percent by weight.

Other additives can include flame retardants, antioxidants, inhibitors (e.g., hydroquinone and benzoquinone), UV radiation absorbers and the like.

Figure 10:
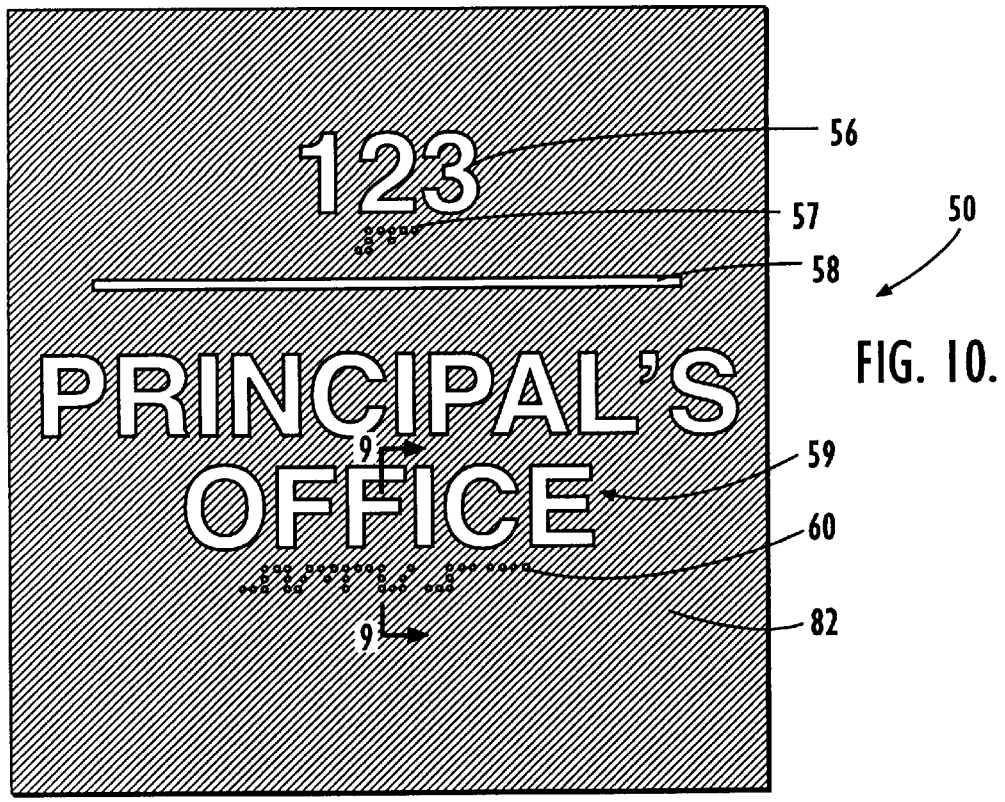
FIG. 10 is a plan view of a decorative article of display according to an embodiment of the present invention wherein the thermosetting resin of the relief portions and the coating of thermosetting resin have different colors.

FIG. 10 is a plan view of a decorative article of display 50 according to an embodiment of the present invention wherein the thin film of resin 82 has a different color from the resin of the relief portions 56–60.

Figure 11:
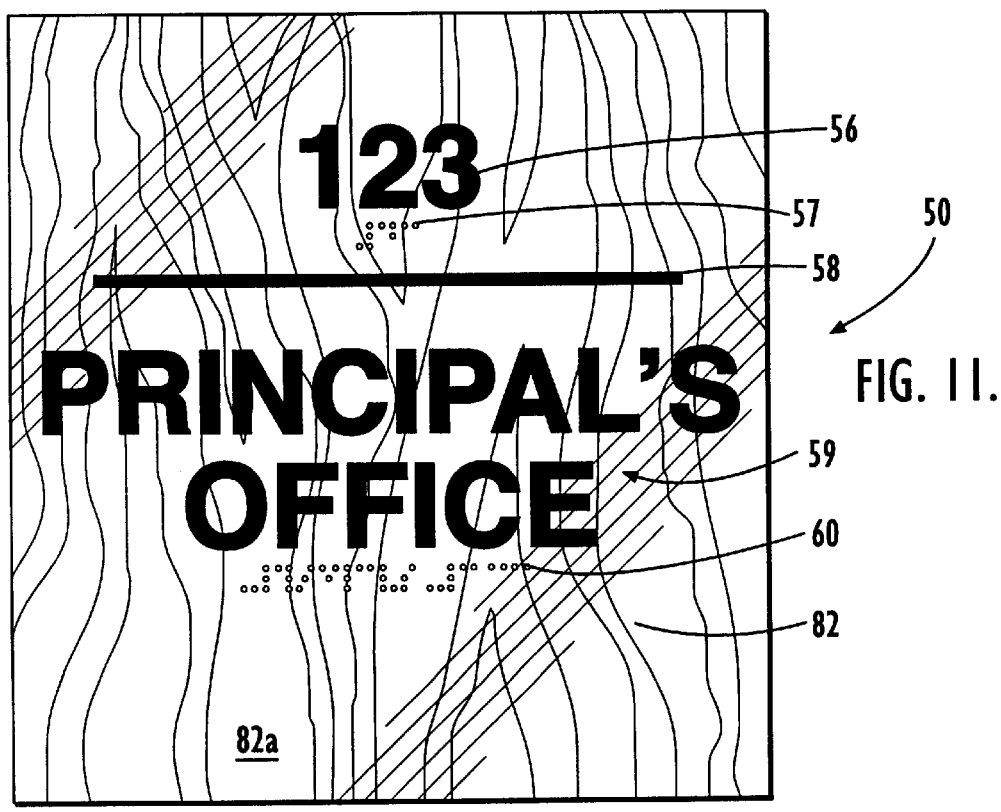
FIG. 11 is a plan view of a decorative article of display according to an embodiment of the present invention wherein the thin layer of thermosetting resin is clear thereby allowing the underlying substrate to be visible.

FIG. 11 is a plan view of a decorative article of display 50 according to an embodiment of the present invention wherein the thin film of resin 82 is clear thereby allowing the underlying backing member 52 to be visible.

Figure 12A:
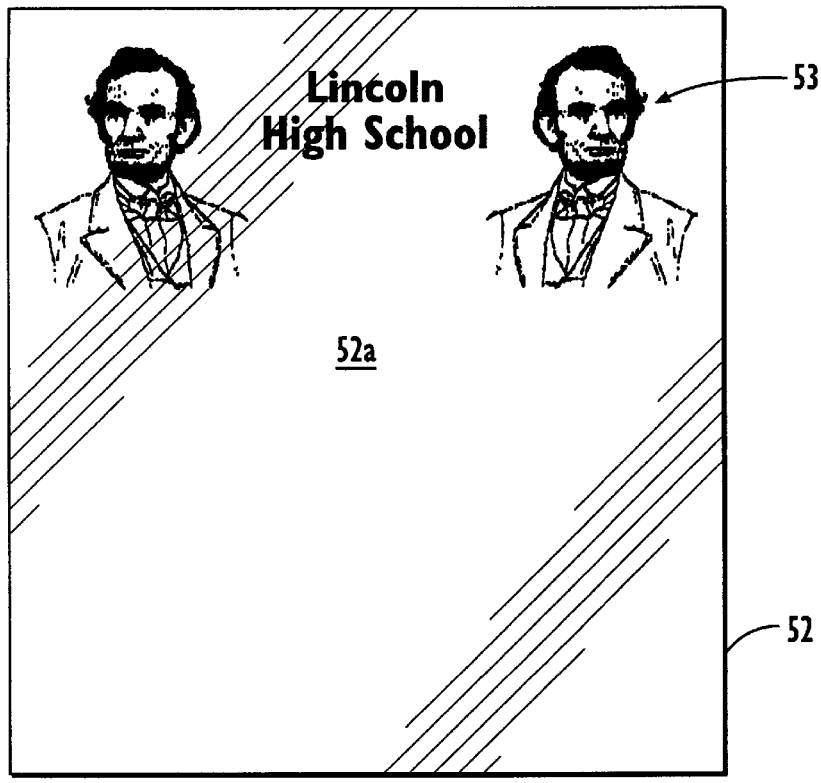
FIG. 12A is a plan view of a substrate having an image disposed on a face thereof.
Figure 12B:
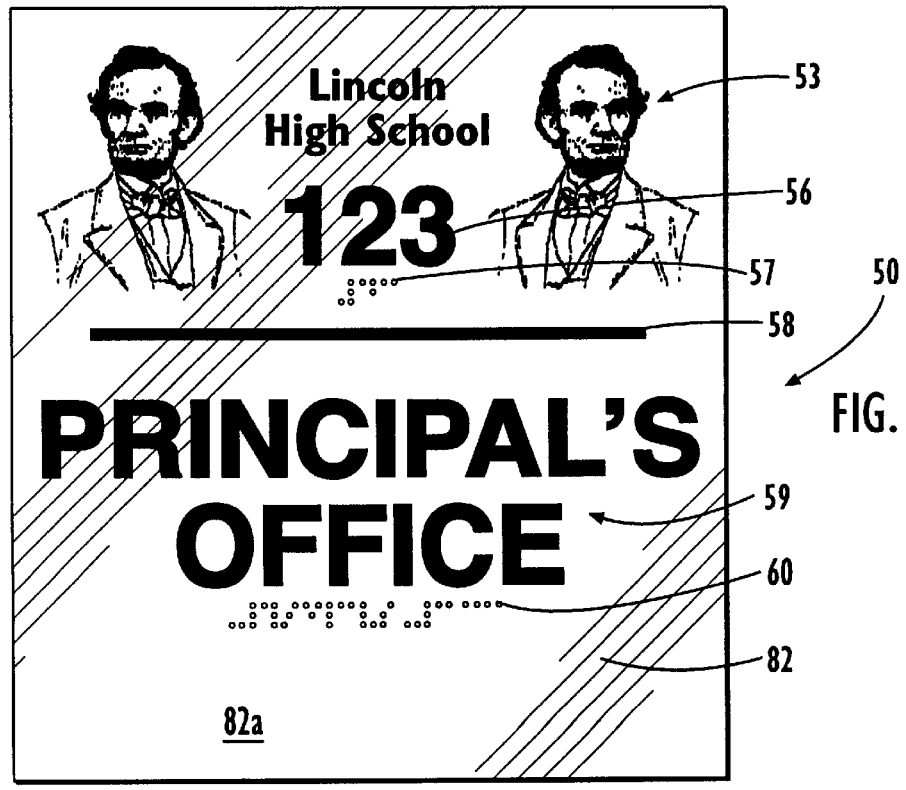
FIG. 12B is a plan view of a decorative article of display according to an embodiment of the present invention utilizing the substrate of FIG. 12A.

FIG. 12A is a plan view of a backing member 52 having an image 53 disposed on a surface 52a thereof. FIG. 12B is a plan view of a decorative article of display 50 utilizing the substrate of FIG. 12A. The decorative article has a thin film of resin 82 that is clear thus allowing the underlying backing member surface 52a and image 53 disposed thereon to be visible.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of producing a low stress, decorative article of manufacture having at least one relief portion extending therefrom, the method comprising the steps of:

casting a first thermosetting resin having a first color into a recess formed within a mold surface, such that the first resin is not in contact with the mold surface;

partially curing the first resin to provide an air inhibited out-of-mold surface;

applying a coating of second thermosetting resin onto the partially cured first resin and onto the mold surface, wherein the second thermosetting resin comprises an air release agent, and wherein the second thermosetting resin coating has a thickness of up to about 0.10 inch;

placing a substrate face in contacting relationship with the second thermosetting resin;

moving the mold and substrate between a pair of pinch rollers to apply a progressively moving compressive force to the second thermosetting resin via the substrate to cause the substrate to tilt relative to the mold surface and push a wave of the second thermosetting resin ahead of a location of the compressive force to prevent air from becoming entrained within the second thermosetting resin;

curing the first and second thermosetting resins to form the low stress, decorative article of manufacture, wherein the second thermosetting resin adheres to the substrate face and such that molecular cross-linking occurs between the first and second thermosetting resins without the second thermosetting resin imparting shear stress on the first thermosetting resin; and removing the low stress, decorative article of manufacture from the mold.

2. A method according to claim 1 wherein the second thermosetting resin has a second color different from the first color of the first thermosetting resin.

3. A method according to claim 1 wherein the second resin cures to a transparent state such that the substrate is visible therethrough.

4. A method according to claim 3 wherein the substrate face comprises an image disposed thereon.

5. A method according to claim 1 wherein the step of moving the mold and substrate between a pair of inch rollers to apply a progressively moving compressive force to the second thermosetting resin via the substrate comprises simultaneously applying a first compressive force to the substrate along a first direction and a second compressive force to the mold along a second direction opposite to the first direction while the mold and substrate are moved along a direction substantially orthogonal to the first and second directions.

6. A method according to claim 1 wherein the first resin is partially cured to a B-stage.

7. A method according to claim 1 wherein the first and second resins are selected from the group consisting of unsaturated polyesters, epoxies, phenolics and polyurethanes, and blends and mixtures thereof.

8. A method according to claim 1 wherein the first and second resins are the same.

9. A method according to claim 1 wherein the step of curing the first and second thermosetting resins comprises curing the first and second resins at a temperature of between about 15° C. and 100° C.

10. A method of producing a low stress, decorative article of manufacture having at least one relief portion extending therefrom, the method comprising the steps of:

casting a first thermosetting resin having a first color into at least one recess formed within a mold surface, such that the first resin is not in contact with the mold surface, wherein the first thermosetting resin is selected from the group consisting of unsaturated polyesters, epoxies, phenolics and polyurethanes, and blends and mixtures thereof;

partially curing the first resin to provide an air inhibited out-of-mold surface;

applying a coating of second thermosetting resin onto the partially cured first resin and onto the mold surface, wherein the second thermosetting resin coating has a thickness of up to about 0.10 inch, wherein the second thermosetting resin is selected from the group consisting of unsaturated polyesters, epoxies, phenolics and polyurethanes, and blends and mixtures thereof, wherein the second thermosetting resin comprises an air release agent;

placing a substrate face in contacting relationship with the second thermosetting resin, wherein the substrate face comprises an image disposed thereon, and wherein the second resin is configured to cure to a transparent state such that the image disposed on the substrate face is visible therethrough;

applying a progressively moving compressive force to the second thermosetting resin via the substrate to prevent air from becoming entrained within the second thermosetting resin;

curing the first and second thermosetting resins to form the low stress decorative article of manufacture, wherein the second thermosetting resin adheres to the substrate face and such that molecular cross-linking occurs between the first and second thermosetting resins without the second thermosetting resin imparting shear stress on the first thermosetting resin; and removing the law stress, decorative article of manufacture from the mold.

11. A method according to claim 10 wherein the step of applying a progressively moving compressive force to the second thermosetting resin via the substrate comprises simultaneously applying a first compressive force to the substrate along a first direction and a second compressive force to the mold along a second direction opposite to the first direction while the mold and substrate are moved along a direction substantially orthogonal to the first and second directions.

12. A method according to claim 10 wherein the first resin is partially cured to a B-stage.

13. A method according to claim 10 wherein the first and second resins are the same.

14. A method according to claim 10 wherein the step of curing the first and second thermosetting resins comprises curing the first and second resins at a temperature of between about 15° C. and 38° C.

15. A method according to claim 10 wherein the at least one recess comprises a configuration of a respective alphanumeric character.

* * * * *